July 4, 1950
W. R. BAKER
2,514,116
INDUCTION REAMER
Filed May 14, 1946
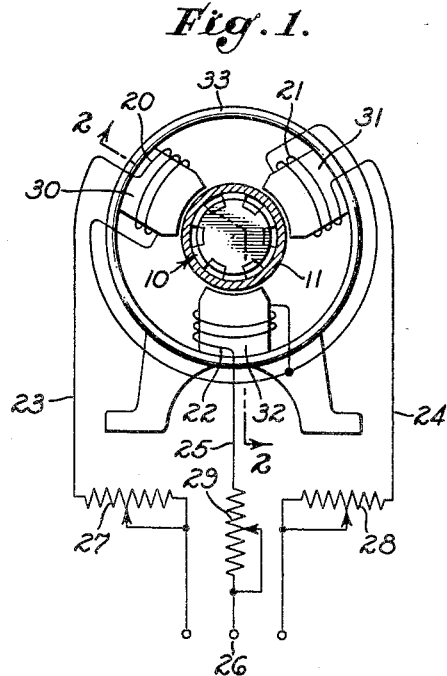
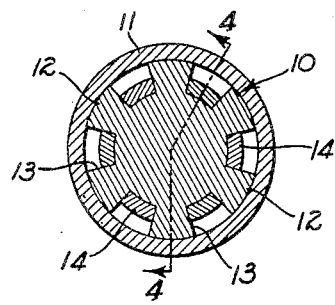
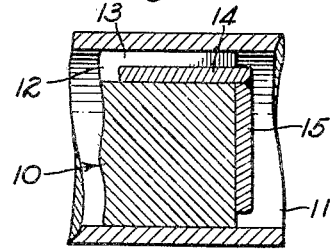
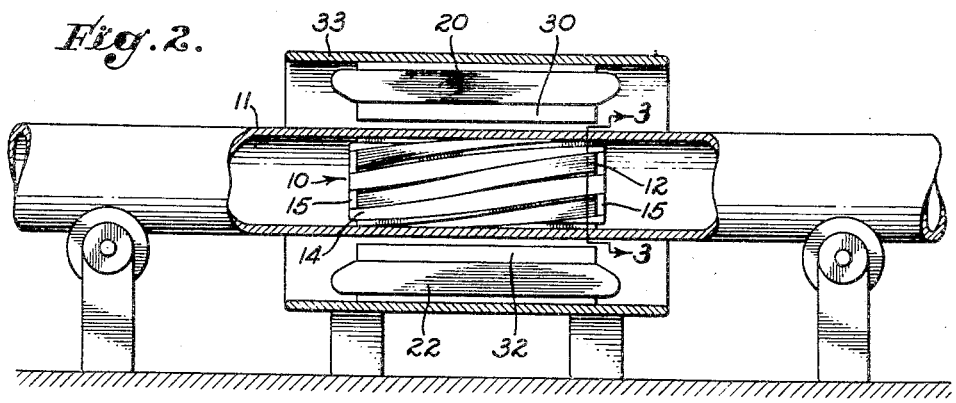
INVENTOR
WILLIAM R. BAKER
BY Robert A. Lavender
ATTORNEY.

Patented July 4, 1950

2,514,116

UNITED STATES PATENT OFFICE 2,514,116

INDUCTION REAMER

William R. Baker, Berkeley, Calif., assignor to the United States of America as represented by the United States Atomic Energy Commission Application May 14, 1946, Serial No. 669,731

6 Claims. (Cl. 15—104.1)

The invention pertains to tools and more particularly to tools for working on the interior of tubes.

In working on the interior of tubes, it has hitherto been found that the longer the tube, the more difficult is the operation. Thus, for example, the cleaning of the tubes of a water-tube boiler is a laborious chore. A usual method is to insert a long drill into the tube and to rotate the drill by means of an electric motor. Alternatively, a short drill is inserted into the tube, and a flexible shaft connects the drill with the actuating motor. Both methods involve considerable difficulty. When a long drill is used, there is always the likelihood of bending it, so that it becomes eccentric with respect to the tube. When a short drill is used, there again arises the uncertainty of centering the drill because of the long shaft with which it must be associated.

The instant invention envisages a novel construction in which there is no tangible connection between the drill or other tool and the motor which drives it. It is accordingly feasible to use a short drill in a tube of any length, while avoiding the risk of bending the shaft or drill.

Accordingly, an object of the invention is the provision of apparatus that can operate on the interior of tubes without any physical connection between the tool and its actuating mechanism.

Another object of the invention is the provision of apparatus that comprises on the one hand an actuating motor and on the other hand a reamer or other working tool.

Another object is the provision of an improved and simplified apparatus and method of operating on the interior of circular tubes and other curved surfaces.

Other objects will appear to those skilled in the art from a reading of the accompanying description.

In the accompanying drawings, which form part of the specification,

Figure 1 represents a diagrammatic vertical view of the improved apparatus as used for reaming the interior of a cylindrical tube;

Fig. 2 is a cross section of the device of Fig. 1, taken along the line 2—2 of Fig. 1;

Fig. 3 is an enlarged cross section of a tool embodying the instant invention, in conjunction with the tube on which it works, taken along the line 3—3 of Fig. 2; and Fig. 4 is an enlarged fragmentary section of the improved tool of Fig. 3, taken along the line 4—4 of Fig. 3.

In the preferred form of the invention, as applied to a device for machining the interior of a circular tube, there is shown a reamer 10 positioned within a tube 11. The reamer 10 is provided with several helical cutting elements 12 on its surface, whereby rotation of the reamer 10 about its longitudinal axis will force the cutting edges 12 against the interior of the tube 11 to ream said interior. The helical cutting edges 12 are separated by helical grooves 13, and arranged in the helical grooves 13 are a plurality of electrical conductors 14. The conductors 14 are so positioned in the grooves 13 that they lie below the surface of the cutting edges 12, and consequently cannot come into contact with the tube 11. As herein illustrated, there are six cutting edges 12 and six helical conductors 14, but the number of these may be varied in accordance with the desired cutting speed, as will be more fully explained hereinafter. At each end of the reamer 10 the ends of the electrical conductors 14 are connected by means of a copper disk 15, whereby all the electrical conductors 14 are joined to form a complete electrical circuit with one another.

The reamer 10, comprising the electrical conductors 14, forms the rotor of a motor of which the stator is provided with three pole windings 20, 21 and 22. The pole windings 20, 21 and 22 are connected electrically, by means of the respective conductors 23, 24 and 25, to a three-phase source of current 26, and the current in the windings 20, 21 and 22 may be balanced by means of variable impedances 27, 28 and 29 provided therefor. The pole windings 20, 21 and 22 are wound respectively on poles 30, 31 and 32, which are spaced inwardly equiangularly from a circular frame 33.

In the operation of the device, the reamer 10 is slid into the interior of the tube 11 to be machined. Thereafter the tube 11 is inserted concentrically within the pole 30, 31 and 32 of the stator, the dimensions being such that the tube does not come into contact with the poles 30, 31 and 32, or with the windings 20, 21 and 22. When the circuit to the source of current 26 is closed, an alternating magnetic field will be generated around each winding 20, 21 and 22. More particularly, the three windings together will produce a resultant magnetic field which will be of constant strength and which field will rotate about the longitudinal axis of the stator at a speed proportional to the frequency of alternation of the source 26, and inversely proportional to the number of poles 30, 31 and 32. The constant magnetic field will rotate about the longitudinal axis of the stator so that when the reamer 10 is in the field of the stator the reamer 10 will serve as a rotor and will rotate with the field, forming in effect an induction motor.

As a result, the reamer 10 will rotate about its longitudinal axis and, when the tube 11 is held stationary relative thereto, will machine the interior of the tube 11.

The reamer 10 will seek a position axially within the field of the stator such that it will cut the maximum magnetic lines of force, and, consequently, after once attaining this position the reamer 10 will not move axially relative to the stator. The tube 11 can be moved axially, and notwithstanding its length, the entire interior may be machined without any physical connection between the tool 10 and its associated stator.

It is apparent that the tube 11 or other object that is to be operated on must be of a material that will permit passage of magnetic flux therethrough.

While the device herein shown has been described as a reamer, it is obvious that the tool 10 may be a tap, grinder, scourer, polisher, driller, cleaner, or any other type of working instrument. The tool 10 may be used on the interior of water tubes, pipes, flues, and other curved members on which it is desired to work with speed and efficiency.

It will be understood, therefore, that the claims appended hereto and forming part of the specification are not intended to be limited to the specific form of the invention embodied in the drawings, and are intended to cover such modifications and variations as reasonably fall within the scope of their terms.

What is claimed is:

1. In apparatus for operating on the interior of a cylindrical tube, an unattached circular tool insertible in said tube, a squirrel cage winding carried by said tool, and means physically not connected with said tool for generating a rotating magnetic field through said squirrel cage winding for rotating said winding and said unattached tool inside of said tube.

2. In apparatus for operating on the interior of a curved surface, an unattached operating tool having a cylindrical surface, a helical groove in said cylindrical surface, a short circuited electrical conductor positioned in said helical groove below the surface of the cylinder of the tool, a stator physically removed from said tool, said stator comprising a plurality of magnetic poles and a winding arranged on each of said poles, and means for energizing said windings with polyphase current, whereby a rotating magnetic field is passed through said conductor to rotate said conductor about the axis of said unattached cylindrical tool.

3. In apparatus for operating on the interior of a cylindrical tube, an unattached operating tool comprising a cylinder having a plurality of helical cutting grooves, a shorted electrical conductor in each groove; a stator physically spaced from and not connected with said operating tool, said stator comprising a plurality of poles and windings on each pole, and means for energizing said windings to produce a rotating magnetic field through said electrical shorted conductors, whereby said conductors and said cylinder are caused to rotate in said cylindrical tube without physical connection.

4. In combination, a stator having an opening therein, a hollow elongated tube disposed in said opening, means supporting said tube for longitudinal movement thereof, a rotatable member devoid of physically connected driving means and positioned within said tube adjacent the stator opening in loose contact with said tube surface, a squirrel cage winding carried by said member, and a rotating-magnetic-field generating means connected to said stator and adapted to induce a current within the winding of the rotatable member thereby to provide rotation of said member.

5. Apparatus defined in claim 4 in which the periphery of the rotatable member supports a working tool surface in contact with the inner surface of the tube.

6. Apparatus defined in claim 4 in which the periphery of the rotatable member supports a working tool surface in contact with the inner surface of the tube and helically disposed with respect to the axis of the tube.

WILLIAM R. BAKER.

REFERENCES CITED

The following references are of record in the file of this patent:

UNITED STATES PATENTS

| Number | Name | Date |
|---|---|---|
| 261,234 | Jameson | July 18, 1882 |
| 393,192 | Thayer | Nov. 20, 1888 |
| 508,380 | Gardner | Nov. 7, 1893 |
| 864,544 | Kessler et al. | Aug. 27, 1907 |
| 1,174,787 | Wilkinson | Mar. 7, 1916 |
| 1,233,569 | Graemiger | July 17, 1917 |
| 1,847,006 | Kalischer | Feb. 23, 1932 |
| 2,406,723 | Von Hortenau | Aug. 27, 1946 |

FOREIGN PATENTS

| Number | Country | Date |
|---|---|---|
| 494,601 | Great Britain | Oct. 28, 1938 |